(12) United States Patent
Reynolds et al.

(10) Patent No.: US 7,694,882 B2
(45) Date of Patent: Apr. 13, 2010

(54) SYSTEM AND METHOD FOR INTEGRATED CIRCUIT CARD DATA STORAGE

(75) Inventors: Charles William Reynolds, Southport, CT (US); Christopher Michael Nardone, Stamford, CT (US)

(73) Assignee: MasterCard International Incorporated, Purchase, NY (US)

( * ) Notice: Subject to any disclaimer, the term of this patent is extended or adjusted under 35 U.S.C. 154(b) by 2130 days.

(21) Appl. No.: 10/266,056

(22) Filed: Oct. 7, 2002

(65) Prior Publication Data

US 2003/0132284 A1 Jul. 17, 2003

Related U.S. Application Data

(60) Provisional application No. 60/327,457, filed on Oct. 5, 2001.

(51) Int. Cl.
*G06K 19/00* (2006.01)
(52) U.S. Cl. ...................................... 235/487; 235/492
(58) Field of Classification Search ................. 235/492, 235/380, 487, 494
See application file for complete search history.

(56) References Cited

U.S. PATENT DOCUMENTS

| | | | |
|---|---|---|---|
| 5,459,304 A * | 10/1995 | Eisenmann | 235/380 |
| 5,578,808 A | 11/1996 | Taylor | |
| 6,370,517 B2 | 4/2002 | Yanagihara et al. | |
| 6,480,935 B1 | 11/2002 | Carper et al. | |

FOREIGN PATENT DOCUMENTS

| | | |
|---|---|---|
| JP | 1996-096042 | 4/1996 |
| JP | 1999-316543 | 11/1999 |
| WO | WO 01/16759 | 3/2001 |

* cited by examiner

*Primary Examiner*—Seung H Lee
(74) *Attorney, Agent, or Firm*—Baker Botts L.L.P.

(57) ABSTRACT

A system and method for obtaining and storing information in an integrated circuit card is provided for use in a transaction over different environments. The card includes a memory unit having data records including formatted and unformatted fields, preferably comprising a name field, a data field and a security level field. The formatted fields are accessible, using generic labels and the unformatted fields are accessible using a non-generic label.

47 Claims, 13 Drawing Sheets

| | NAME | DATA | SECURITY LEVEL |
|---|---|---|---|
| 268 | Name | Charles Porter | Public |
| 270 | Date Of Birth | 5/5/91 | Public |
| 272 | Address | P.O. Box 3215 | Conditional |
| 274 | Phone | 917-249-3055 | Private |
| 276 | Card Number | 5416 | Private |
| 278 | Shirt Size | L | Public |
| 280 | Name, Birthday | Julia, April 1999 | Private |
| 282 | To Do | Status Report | Private |
| 284 | Maximum PIN Attempts | 4 | Public |
| 286 | Memo | Get ice cream | Private |
| 288 | Personal Likes | Golf | Public |
| 290 | Open | call Phil | Private |
| 292 | Password | Yahoo, UserID | Private |

|  | NAME | DATA | SECURITY LEVEL |
|---|---|---|---|
| 268 | Name | Charles Porter | Public |
| 270 | Date Of Birth | 5/5/91 | Public |
| 272 | Address | P.O. Box 3215 | Conditional |
| 274 | Phone | 917-249-3055 | Private |
| 276 | Card Number | 5416 | Private |
| 278 | Shirt Size | L | Public |
| 280 | Name, Birthday | Julia, April 1999 | Private |
| 282 | To Do | Status Report | Private |
| 284 | Maximum PIN Attempts | 4 | Public |
| 286 | Memo | Get ice cream | Private |
| 288 | Personal Likes | Golf | Public |
| 290 | Open | call Phil | Private |
| 292 | Password | Yahoo, UserID | Private |

SYSTEM AND METHOD FOR INTEGRATED CIRCUIT CARD DATA STORAGE

PRIORITY AND RELATED APPLICATIONS

This application claims priority to U.S. provisional application No. 60/327,457 filed on Oct. 5, 2001, and entitled "Method and System for Smart Card Data Storage," which is hereby incorporated by reference, and is related to U.S. application Ser. No. 10/236,302, filed Sep. 6, 2002, and entitled "Method and Device for Control By Consumers Over Personal Data," also incorporated by reference.

FIELD OF THE INVENTION

The present invention relates generally to a system and method for performing transactions with payment cards and more particularly to a system and method for storing on such cards and utilizing, on a selective and varied security basis, information generated from such transactions.

BACKGROUND OF THE INVENTION

Integrated circuit cards or chip cards, devices having embedded microelectronic circuits, are used today as payment cards for conducting transactions, as well as for many other purposes. Such cards may store multiple applications ranging from credit, debit or stored value applications, to non-value applications including loyalty or authentication. Chip cards typically contain a certain number of erasable or nonerasable memory areas for storing, in part, such applications and data related to the applications and the transactions being conducted. Chip cards having a microprocessor are generally referred to as smart cards in which the microprocessor generally controls data handling and access to the different memory areas on the card based on a given set of conditions (passwords, encryption, external devices, etc.), which are well utilized and known in the art.

In the smart card industry, particularly related to transactions, much emphasis is placed on how best to capture, store, utilize, and maximize data personal or unique to the cardholder. For instance, in the smart card industry, particularly related to financial transactions, much emphasis is placed on how best to capture, store, utilize, and maximize data personal or unique to the cardholder. For instance, Gemplus' GemUtilities and Schlumberger's SmartValet allow cardholders to store personal information, and then interact with it, but this functionality is limited in that the data can only be accessed via a personal computer, and the information is stored and accessed in a proprietary mechanism. In other words, GemUtilities card information can only be accessed by a GemUtilities equipped personal computer; there is no interoperability. Further, the allowable data fields (name, address, phone number, and the like) are not user selectable, and some data is not user modifiable.

OBJECTS AND SUMMARY OF THE INVENTION

Therefore, an object of the present invention is to provide a method and system for providing increased flexible, configurable and controllable interactions among the payment card, the payment terminal, external devices, and payment supporting entities.

Another object of the invention is to provide a system for obtaining and storing information in an integrated circuit card used by a cardholder for conducting transactions over more than one environment each having a different type of card-accepting terminal, such as a POS terminal, a PDA device, a mobile device or a personal computer.

Preferably, the card contains a memory unit having data records for storing information, the records having both formatted and unformatted fields. The formatted fields are accessible using generic labels preferably over at least two different environments and the unformatted fields are uniquely accessible using a non-generic label.

Preferably, the data records comprise a name field and a data field and include an associated security level field for storing data indicative of a level of security (such as public, private or conditional) to be applied to the associated data record.

Another object of the present invention is to provide a system and method for accessing a memory device located within an integrated circuit of an integrated circuit card. The system includes a plurality of formatted data records, wherein each of the plurality of formatted data records includes a standardized name portion and a data portion, wherein labels stored in the standardized name portion of each of the plurality of formatted data records are known to a plurality of terminals. A plurality of unformatted data records are also provided, wherein each of the plurality of unformatted data records include a nonstandardized name portion and a data portion.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 2B is a memory map of data stored in a memory unit of the integrated circuit section of the card illustrated in FIG. 1B according to an exemplary embodiment of the present invention;

Figure 1A:
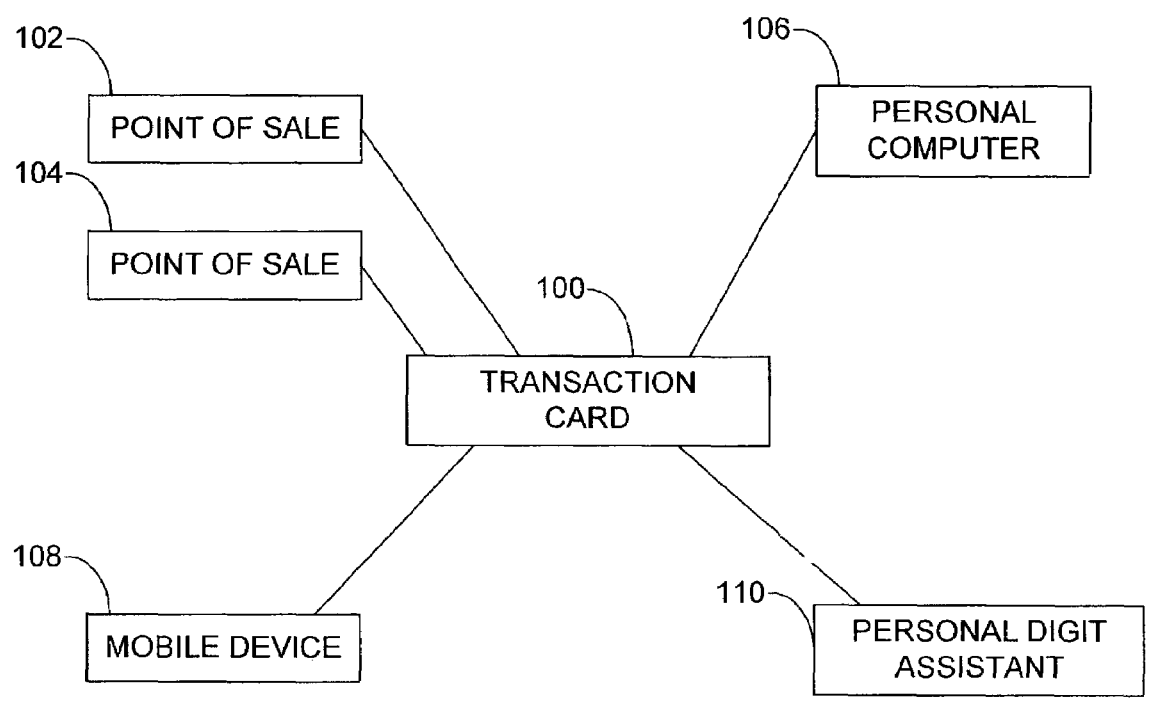
FIG. 1A is a diagram of the interacting components of a system for storing data having multiple security levels according to an exemplary embodiment of the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

In accordance with the system of the present invention, a consumer can use a transaction card (financial or non-financial) to make purchases and receive benefits from a point of sale device ("POS") and update information stored on the transaction card from a personal computer, a personal digital assistant or a mobile device. The system preferably includes a transaction card, a personal computer, a personal digital assistant, a mobile device, at least one POS terminal, and/or any other type of card accepting device. Each of the at least one POS terminals has a processor, interface hardware, and interface software configured to interact with the transaction card. If not embedded in the interface hardware, the POS terminal may have a separate card reader. Also part of the system are external networks such as those belonging to the telephone industry which can convey financial and banking information. The present invention facilitates the loading of information onto the transaction card, the payment for goods or services using the transaction card, the receipt of benefits from affinity programs, i.e. vendor specific rewards programs, through the transaction card, and accounting and security associated with those functions.

The transaction card is preferably an integrated circuit ("IC") card (also called a "smart card"), which is typically the size of a conventional credit card, but which contains a microprocessor and memory. The card can be used to perform transactions, but can have other non-financial uses such as storing health records, travel preferences, telephone information, retailer affinity program information (e.g., frequent flier), and the like. In a preferred embodiment, the IC card can perform credit, debit, or electronic cash card functions, or a combination of the three, that allow a cardholder to make purchases. Transaction data can also be recorded on the card.

The system, as illustrated in FIG. 1A, preferably includes a transaction card 100, and different operating environments including POS terminals 102, 104, a personal computer 106, a mobile device 108 and a personal digital assistant 110, each of which will now be briefly described. The transaction card 100 carries information having multiple or varying security levels, allowing for restricted access depending on the information sought to be accessed, as described in greater detail below. The information stored within the transaction card 100 is tagged for organizational purposes, such that it is relatively simple to understand and utilize.

Each of the POS terminals 102, 104, which may be integrated with an electronic card reader, execute a POS terminal application. In particular, the reader reads public and confidential information stored in the transaction card, and the POS terminal acts upon the read data stored on the transaction card 100, also as described in greater detail below. The personal computer 106 executes a data management application which is used to populate, read and manage data stored on the transaction card 100. The mobile device 108 and the personal digital assistant 110 similarly execute, respectively, a mobile application and a PDA application, which are also used to populate, read and manage data stored on the transaction card 100.

Advantageously, the POS terminal application, the data management application, the PDA application, and the mobile application (the "Applications") preferably all prompt and allow a user not only to access relevant stored information such as loyalty points, credit card or banking account balance, but also to provide personal information (to be securely stored on the card), such as personal preferences regarding shopping, clothing, sizing, budget, or any other information personal or unique to the user, which could be used by retailers or sellers to customize, target or tailor offers, specials or advertising.

Figure 1B:
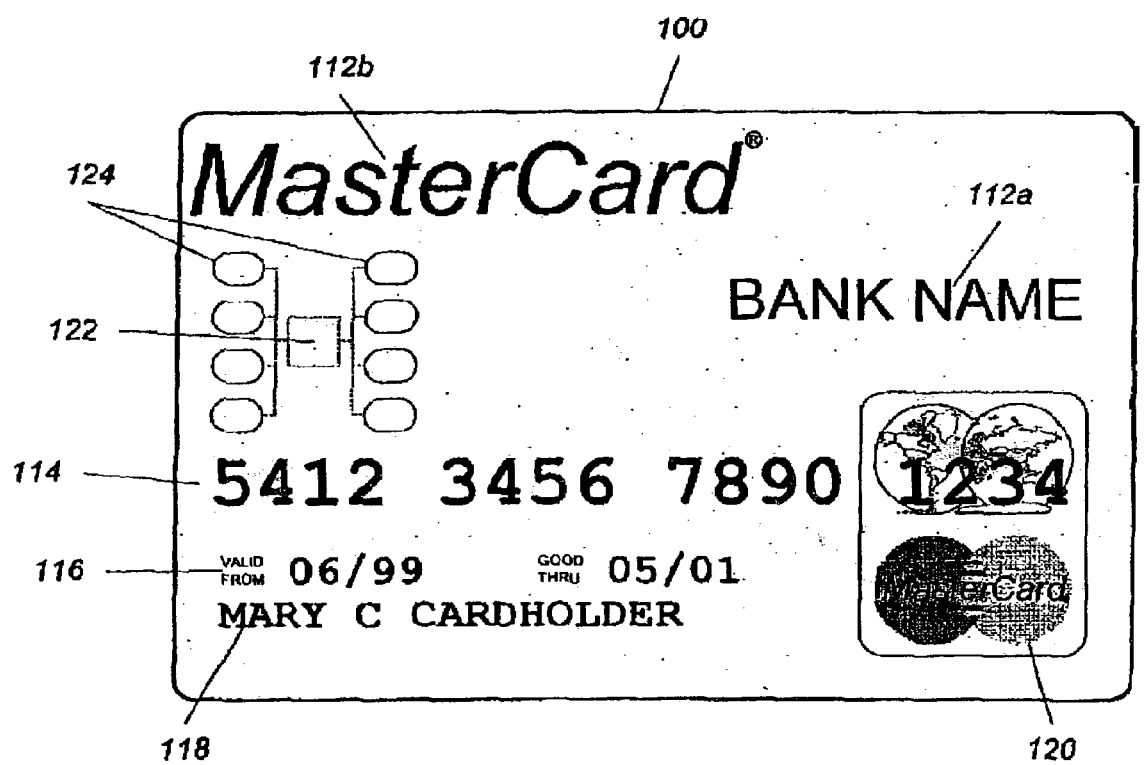
FIG. 1B is a diagram of a transaction card incorporating integrated circuit technology according to an exemplary embodiment of the present invention.

FIG. 1B illustrates the transaction card 100. The transaction card 100 incorporates integrated circuit technology into a conventional credit card. The transaction card 100 looks similar to a conventional credit card, but also includes an integrated circuit ("IC") 122, which contains a microprocessor, and electrical contacts 124 for communications between the IC 122 and devices external to the transaction card 100. Contactless cards and other means of communications, not shown, may also be used. The transaction card 100 can be used as a credit card, a debit card, or as an electronic cash card, i.e., a card containing monetary value that can be transferred when the cardholder makes purchases. An example of an electronic cash card is a card with the MONDEX™ electronic cash application. Similar to a conventional credit card, the front side of the transaction card 100 preferably contains either the name 112a of a financial institution that issues the card or the name 112b of a payment system (e.g., MasterCard®) under whose authority the card is issued, or both, a cardholder's account number 114, the cardholder's name 118, dates 116 between which the card is valid and usable, and a brand 120 associated with the payment system. Although not shown, non-branded and/or non-payment cards may be used as well.

Figure 2A:
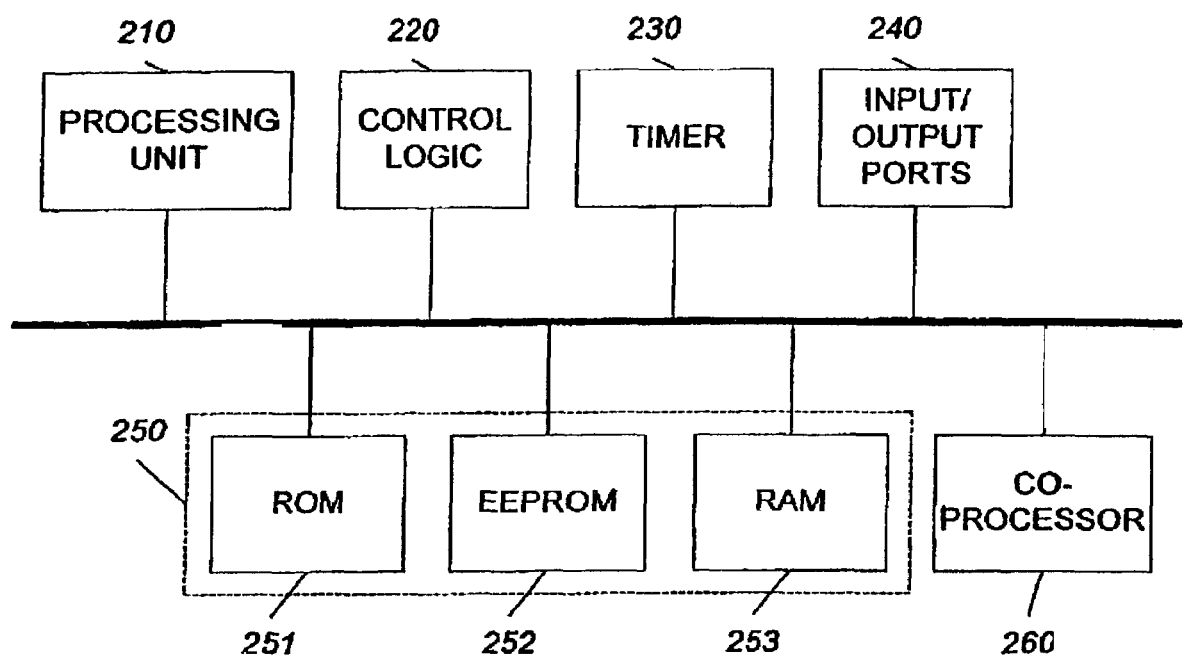
FIG. 2A is a functional block diagram of the integrated circuit section of the card illustrated in FIG. 1B according to an exemplary embodiment of the present invention.

FIG. 2A is a functional block diagram of the IC section 122 and contains at least processing unit 210 and memory unit 250. Preferably, the IC 122 also includes control logic 220, a timer 230, and input/output ports 240. The IC section 122 can also include a co-processor 260. Control logic 220 provides, in conjunction with processing unit 210, the control necessary to handle communications between memory unit 250 and the input/output ports 240. The timer 230 provides a timing reference signal from processing unit 210 and control logic 220. Co-processor 260 provides the ability to perform complex computations in real time, such as those required by cryptographic algorithms.

Memory unit 250 may include different types of memory, such as volatile and non-volatile memory and read-only and programmable memory. Memory unit 250 stores IC card data such as secret cryptographic keys and a user's personal identification number ("PIN"). The secret cryptographic keys may be any type of cryptographic keys, such as the private keys of public-private key pairs. Preferably, the secret cryptographic keys are stored in a secure area of ROM or EEPROM that is either not accessible or has very limited accessibility from outside the IC card.

Memory unit 250 also stores the operating system of the IC card. The operating system loads and executes IC card applications and provides file management or other basic card services to the IC card applications. One operating system that can be used to implement the present invention is the MULTOS™ operating system licensed by Mondex International Ltd. Preferably, the operating system is stored in ROM 251.

In addition to the basic services provided by the operating system, memory unit 250 may also include one or more IC card applications. For example, a MasterCard® Credit/Debit application could be stored on card 100. Additionally, if the IC card is to be used as an electronic cash card, the MONDEX™ electronic cash application might be included on the IC card, which electronically loads onto the IC card a value of a certain currency from a cardholder's account in a financial institution. An application may include both program and data files, which may be stored in either ROM or EPROM.

FIG. 2B is a memory map of exemplary data stored in a portion of the memory unit 250. The memory map of the memory unit 250 is organized into thirteen data records 268, 270, 272, 274, 276, 278, 280, 282, 284, 286, 288, 290, 292. Each of the thirteen data records 268-292 include three data fields: a name field 262, a data field 264 and a security level field 266. The name field 262 of each data record contains a label. The label is used to index the remainder of a data record, such that a data record is selected by specifying a particular label and searching the data records stored in the memory unit 250 for a data record having a matching label in the name field 262. The data field 264 contains information relating to the transaction card 100 or the user of the transaction card 100. The security level field 266 contains a security level rating. Preferably, the security level rating can be one of private, conditional and/or public; other levels could be added or the actual architecture need not have a security level field associated with every piece of data.

The security level rating is preferably used to determine the process necessary to decrypt the information contained in the associated data field 264. Information stored in the data field 264 of a data record having a public security level rating (for example, data record 268) is not encrypted. Information stored in the data field 264 of a data record having a conditional security level rating (for example, data record 272), is encrypted and must be decrypted according to a particular process. Information stored in the data field 264 of a data record having a private security level rating (for example, data record 282), is encrypted and can only be decrypted if a PIN is provided.

The data stored in a data record having a public security level rating is unprotected by encryption. Preferably, data records having a public security level rating may include the cardholder's name, and the like. Data records having a public security level rating, such as the data records 268, 270, 278, 284, 288, can be read by any device.

The data stored in a data record having a conditional security level rating is protected by encryption. Preferably, data records having a conditional security level rating include data records containing data relevant to a particular vendor, POS, or type of vendor and can only be read by a device with a particular decryption key. Data records having a conditional security level rating, such as the data record 272 can be read only by devices having the appropriate decryption key for the particular data record. The particular decryption key may be a payment industry key, may be vendor specific, or the like.

The data stored in a data record having a private security level rating is protected by encryption. Preferably, data records having a private security level rating include passwords, financial data, and the like. A data record having a private security level rating, such as the data records 274, 276, 280, 282, 286, 290, 292 can only be decrypted when the customer provides the PIN associated with the transaction card 100.

The number of times a user may attempt to decrypt the data field 264 of a data record having a private security level rating during a given session is limited by the number stored in the data field 264 of a data record having a label "maximum PIN attempts" stored in the name field 262. An example of such a data record is shown as the data record 284. The label "maximum PIN attempts" is stored in the name field 262 of the data record 284, the number four is stored in the data field 264 of the data record 284, and the security level field 266 is set as public. The use of this field is described in more detail in relation with flow charts 700 and 710 depicted in FIGS. 7 and 8, respectively.

Preferably, in accordance with the present invention, each of the data records 268-292 is one of two types of data record: one having formatted data fields ("formatted data record") and the other having unformatted data fields ("unformatted data record"). The formatted data record contains information having common, generic meaning, and each record is associated with a common, generic label stored in the name field 262. This creates a generic language that makes the provided information actionable (useable) across different merchants, different terminals and/or different environments (i.e., to any POS, personal computer, PDA, mobile device, or the like configured to use the transaction card 100). In other words, the labels of the formatted data records act as addresses for the associated data records allowing for the generation of a generic language that makes the information stored in the data records understandable to a variety of merchants and/or users—the key being that the information does not have meaning to only a specific limited group, merchant or person.

The data fields 264 of the formatted data records are populated by the cardholder or another data provider, such at the merchant or issuer, for example, as follows: the user or other data provider is offered for selecting and/or selects the formatted data record to be populated by specifying a particular label using an Application as defined above. (Alternatively, the prompting application could be stored on the card itself.) Once the Application finds the associated data record, the user or other data provider provides the requested information and the same Application writes the provided information to the data field 264 of the selected data record on the card.

In contrast to formatted data records, unformatted data records have meaning only to a specific group, merchant or user. Such records act as small information tokens containing information relevant to a particular issuer, merchant, author or owner ("source") and which have no generic meaning. The labels of unformatted data records are not generic or standardized, meaning that the stored information in that record has meaning to a particular source.

Preferably, a cardholder is provided by a terminal device with the option of having an information token stored on the card. If accepted, the token would be stored as an unformatted data record having unformatted fields with no generic or standardized label for reference; rather, the unformatted record would or could be understood only by the source using a non-generic label. The information token may be a reference to a database record, it may define a cardholder's personal preferences, it may establish the user's affinity program membership, it may represent a coupon for the user, or the like. For example, the source of the information could be a user himself or a merchant, such as a major airline. A particular POS under control of the airline could write frequent flier information to the unformatted data record on the card. The label stored in the name field 262 of the at least one data record would only be known to the airline.

The unformatted data records allow the POS 102, 104 to target offers and rebates to particular cardholders, offer cardholders better service, and reduce times at checkout at the POS 102, 104. The use of unformatted data records also allows companies to offer increased services and benefits to the cardholder which boosts cardholder loyalty.

Figure 3:
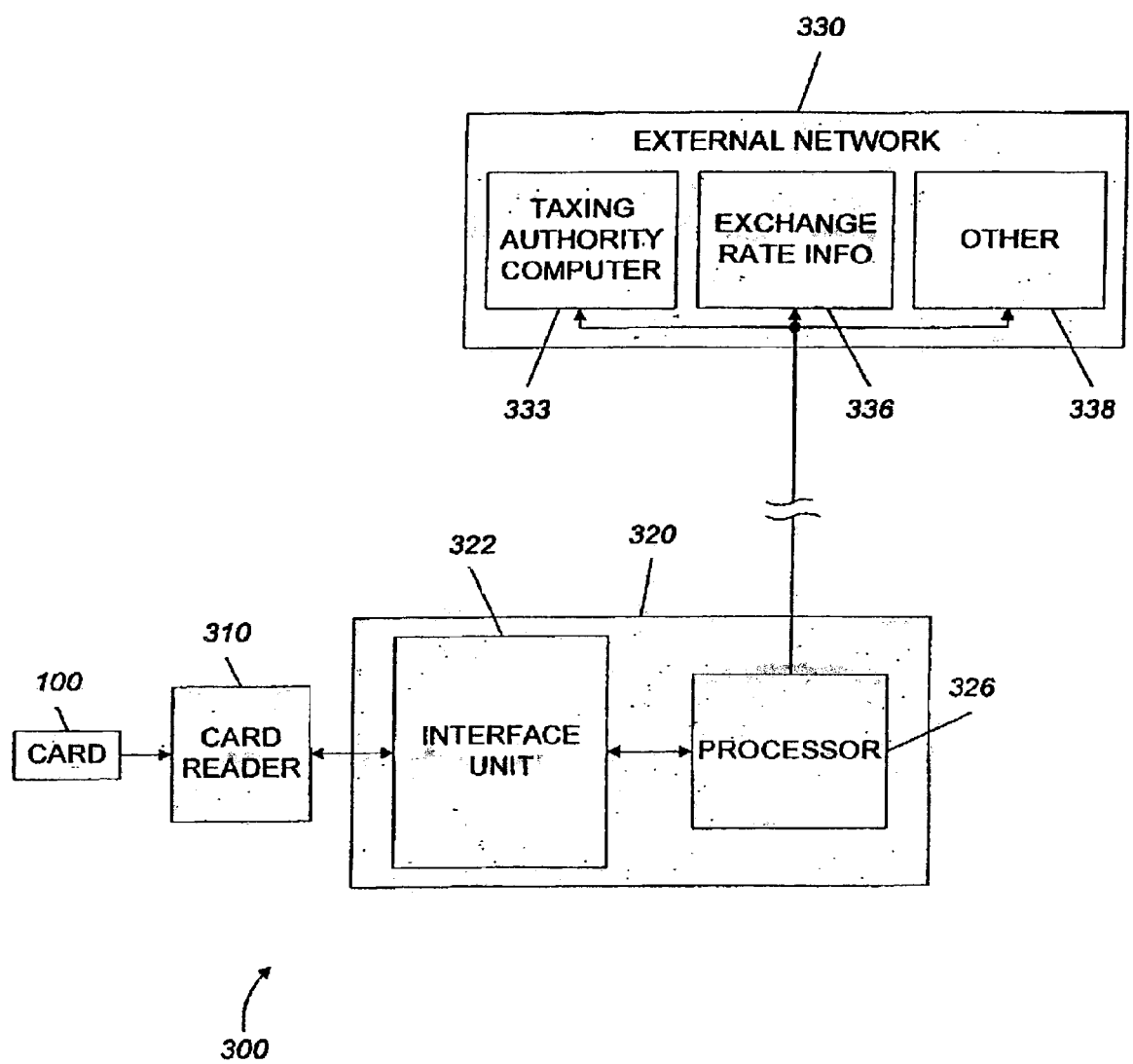
FIG. 3 is a block diagram of a part of the system shown in FIG. 1A using the transaction card of FIG. 1B according to an exemplary embodiment of the present invention.

FIG. 3 is a block diagram of a system 300 for reading information from the IC card. System 300 includes a terminal 320. The term "terminal" generically describes devices with which an IC card may communicate. Several examples of terminals are pictured in FIGS. 4A-4D and 6A, including a kiosk-type interface terminal 410 shown in FIG. 4A, a personal computer 470 that operates as a terminal shown in FIG. 4B, a PDA 480 that operates as a terminal shown in FIG. 4C, a mobile device 490 that operates as a terminal shown in FIG. 4D, and a POS terminal as shown in FIG. 6A.

Within terminal 320 are interface unit 322 and processor 326. Interface unit 322 may consist of a combination of hardware and software, including a display screen, designed to communicate with a cardholder, and buttons keypads, or keyboards with which a cardholder inputs data to the terminal. Interface unit 322 may also include a card reader into which the cardholder inserts card 100 in order to exchange data. Alternatively, the card reader could be external to interface unit 322 as shown by card reader 310.

Processor 326 communicates with interface unit 322 and processes the commands and data provided to the terminal by the cardholder. Processor 326 also communicates with devices outside of the terminal and not directly accessible to the cardholder such as external network 330. This communication can be accomplished, for example, using standard short-distance and long-distance communication networks such as local-area and wide-area networks, or via telephone-based or wireless communication lines or dedicated transmission lines.

Terminal 320 can be located in a store or other commercial establishment that accepts card 100 for the purchase of goods and services. Processor 326 can communicate with devices external to terminal 320 such as credit or debit card processing networks (not shown), to which credit or debit card information can be sent and verification for the purchase can be received. This communication can be accomplished using conventional credit and debit card processing methods.

Figure 4A:
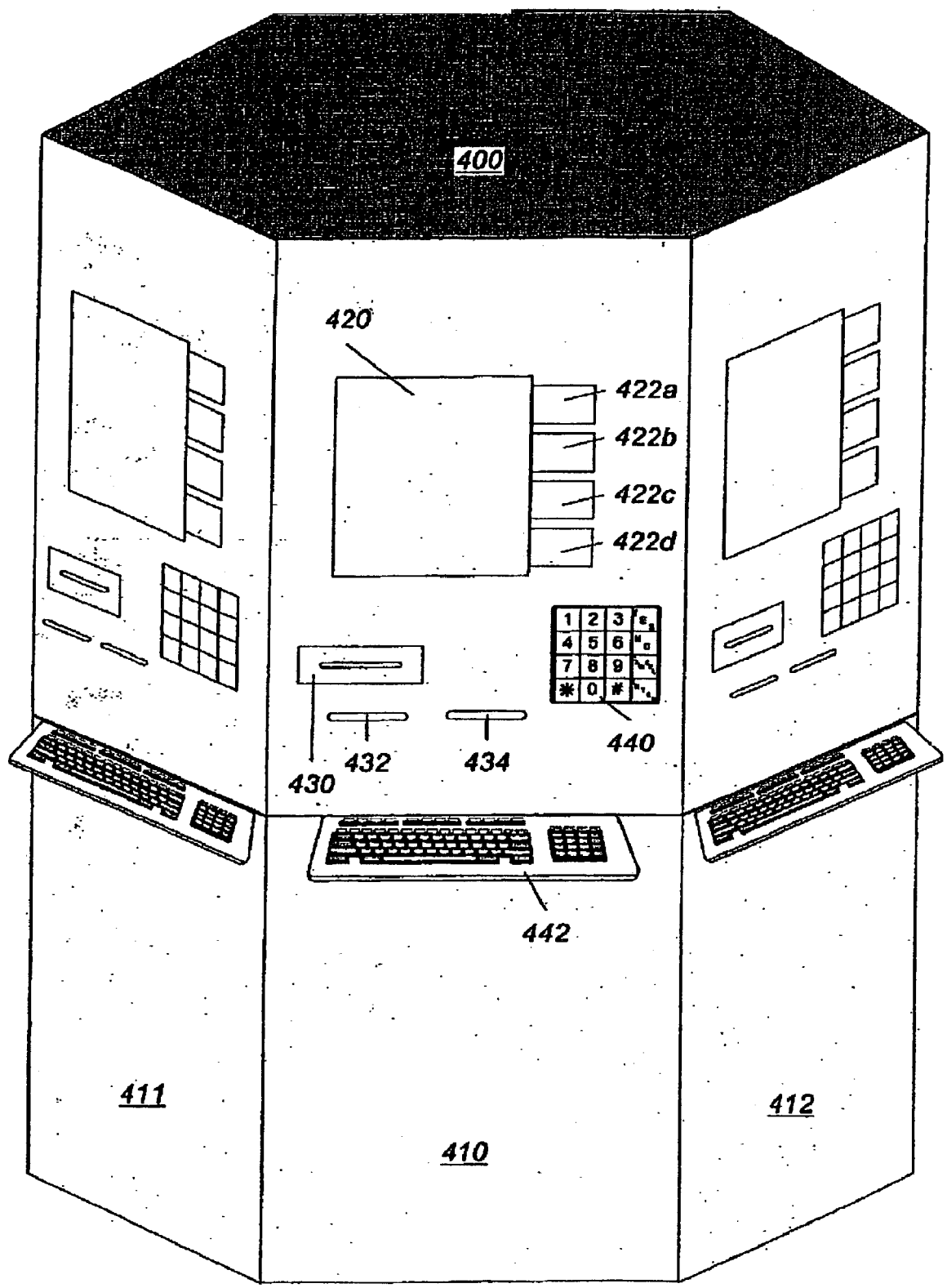
FIG. 4A illustrates a stand along kiosk terminal for use in the system of FIG. 1A according to an exemplary embodiment of the present invention.

FIGS. 4A-4D illustrate examples of various terminals for use with the IC card 100. Kiosk-type terminal 410 shown in FIG. 4A is a preferred embodiment for use in a public forum such as a shopping mall or movie theater. In FIG. 4A, kiosk 400 contains several terminals 410, 411, 412, each of which operates independently. Each terminal 410, 411, 412 includes a display screen 420, interface buttons 422a, 422b, 422c, and 422d, card receptacle 430, keypad 440, receipt dispenser 432, and refund/cash dispenser 434. Optionally, keyboard 442 may be supplied to allow the user to input words to the terminal. Menus may be displayed on screen 420. Menu options are chosen using buttons 422a-d. Keys on keypad 440 can include the digits 0-9, special characters ("*" or "#"), and some function keys such as "YES," "NO," "Cancel," and "Enter." These keys can be used for inputting a user's PIN and other information. In addition, instead of choosing menu options using buttons 422a-d, a user may choose an option using the keys on keypad 440 or keyboard 442 (e.g., pressing "1" for the first menu option, "2" for the second menu option, etc.). If the kiosk-type terminal 410 is also used as an Automatic Teller Machine ("ATM"), the keys on keypad 440 could be used to input amounts of money to be dispensed by the machine or monetary value to be placed on the electronic cash portion of card 100.

Figure 4B:
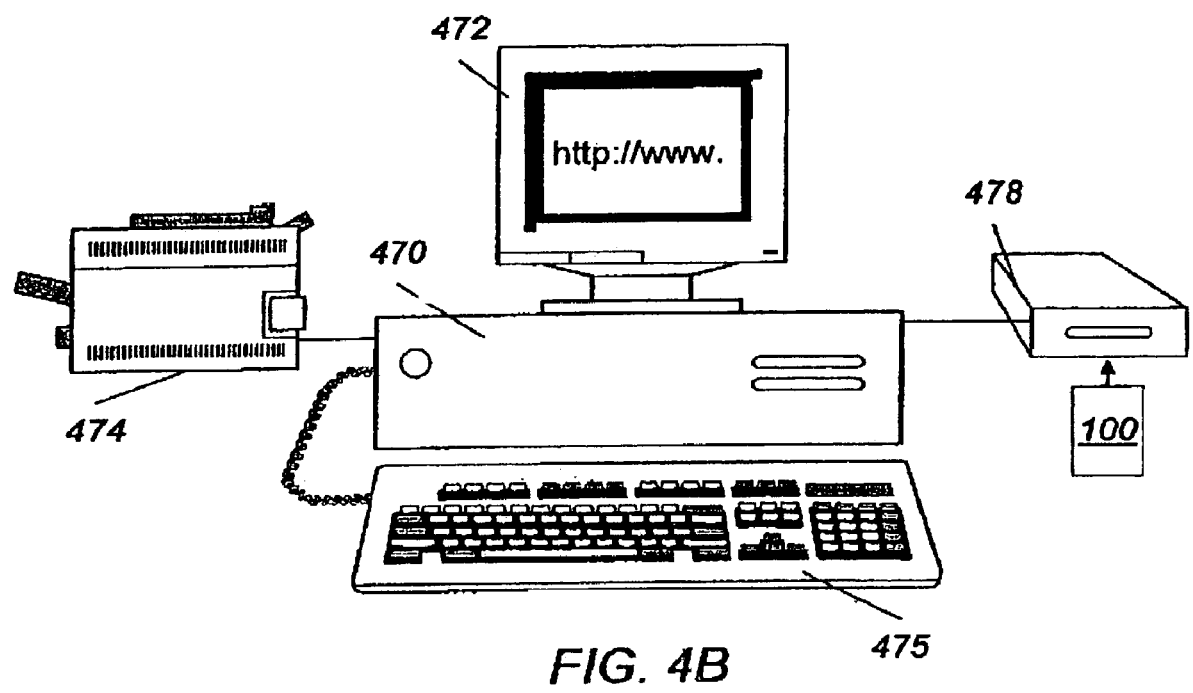
FIG. 4B illustrates a personal computer for use in the system of FIG. 1A using the transaction card of FIG. 1B according to an exemplary embodiment of the present invention.

In FIG. 4B, a computer 470 operates as a transaction terminal via the Internet. Included with computer 470 is monitor 472, keyboard 475, and printer 474. Connected to the serial port of computer 470 is card reader 478 which accepts card 100. The screen of monitor 472 operates in a manner similar to that of display screen 420 in kiosk-type terminal 410. Likewise, printer 474 operates similarly to receipt dispenser 432, and keyboard 475 operates similarly to keypad 440 or keyboard 442, if available.

Figure 4C:
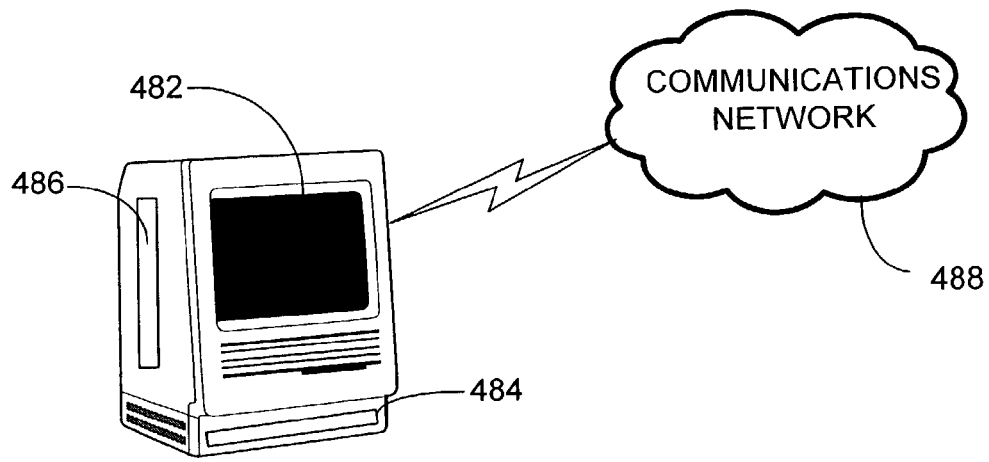
FIG. 4C illustrates a personal digital assistant for use in the system of FIG. 1A using the transaction card of FIG. 1B according to an exemplary embodiment of the present invention.

In FIG. 4C, a PDA 480 operates as a transaction terminal via a communications network 488. Preferably, the communications network 488 is the Internet. Included with the PDA 480 is a display screen 482, a textual input device 484, and a card reader 486. Preferably, the textual input device 484 is a handwriting recognition input device for use with a stylus or other pen-like device. The display screen 482 operates in a manner similar to that of display screen 420 in kiosk-type terminal 410. Likewise, the textual input device 484 operates similarly to keyboard 442.

Figure 4D:
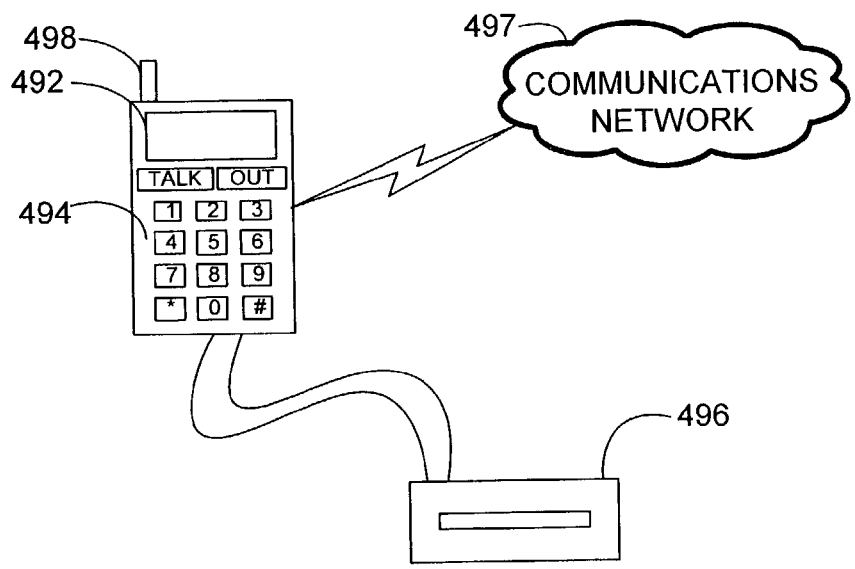
FIG. 4D illustrates a mobile device for use in the system of FIG. 1A using the transaction card of FIG. 1B according to an exemplary embodiment of the present invention.

In FIG. 4D, a mobile device 490 operates as a transaction terminal via a communications network 497. Preferably, the communications network 497 is the Internet. Included with mobile device 490 is a display screen 492, a textual input device 494, and an antenna 498. Preferably, the textual input device 494 is a traditional telephone keypad. The display screen 492 operates in a manner similar to that of display screen 420 in kiosk-type terminal 410. Likewise, the textual input device 494 operates similarly to keypad 440. The mobile device 490 communicates with the communications network 497 through the antenna 498.

Figure 5:
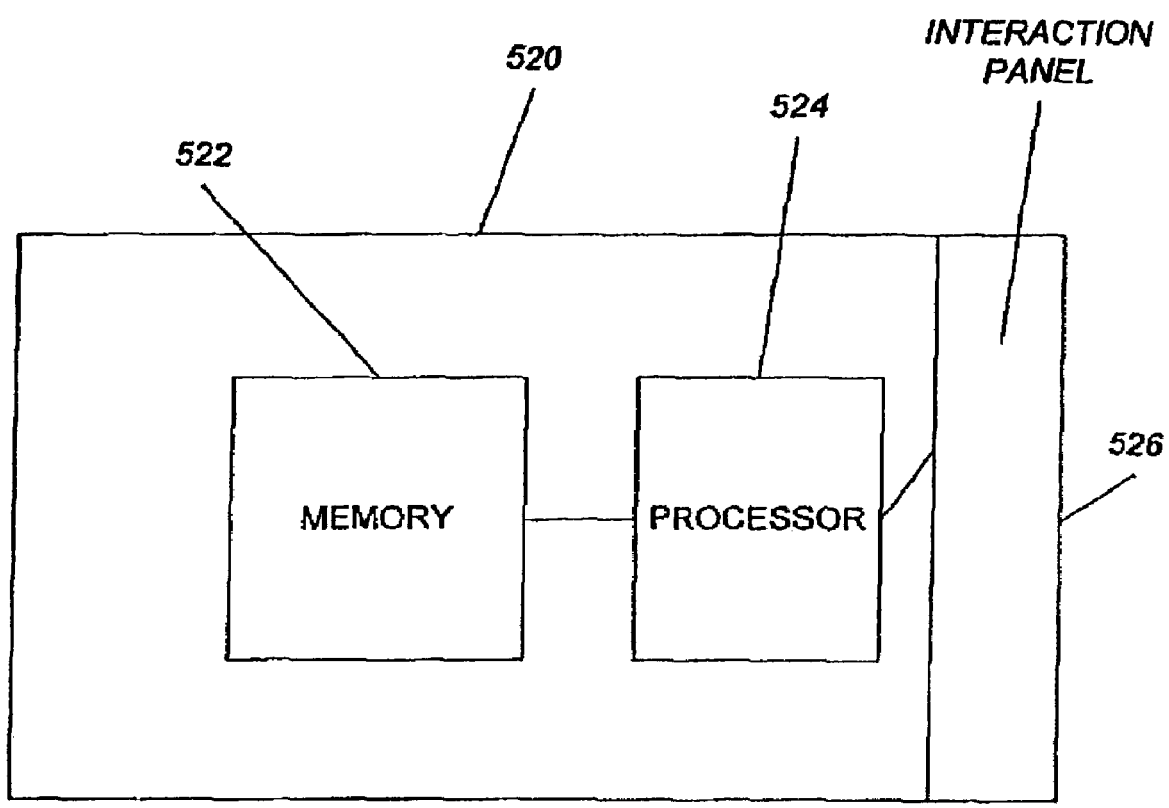
FIG. 5 is a functional block diagram of the terminals illustrated in FIGS. 4A-4D according to an exemplary embodiment of the present invention.

FIG. 5 is a block diagram of the transaction terminals illustrated in FIGS. 4A-4D. Each terminal 520 includes processor 524, connected to both memory 522 and interaction panel 526. Interaction panel 526 includes the display screens, the buttons with which menu options are chosen, the keypad or keyboard, the card receptacle or the card reader, the receipt dispenser or printer, and the refund dispenser. Processor 524 processes, controls, and outputs data to interact with the user via interaction panel 526. Processor 524 also controls memory 522 which stores dynamic information such as the options chosen by the cardholder during the current session, and static information such as transaction history, cardholder PIN, and exchange rate history.

Figure 6:
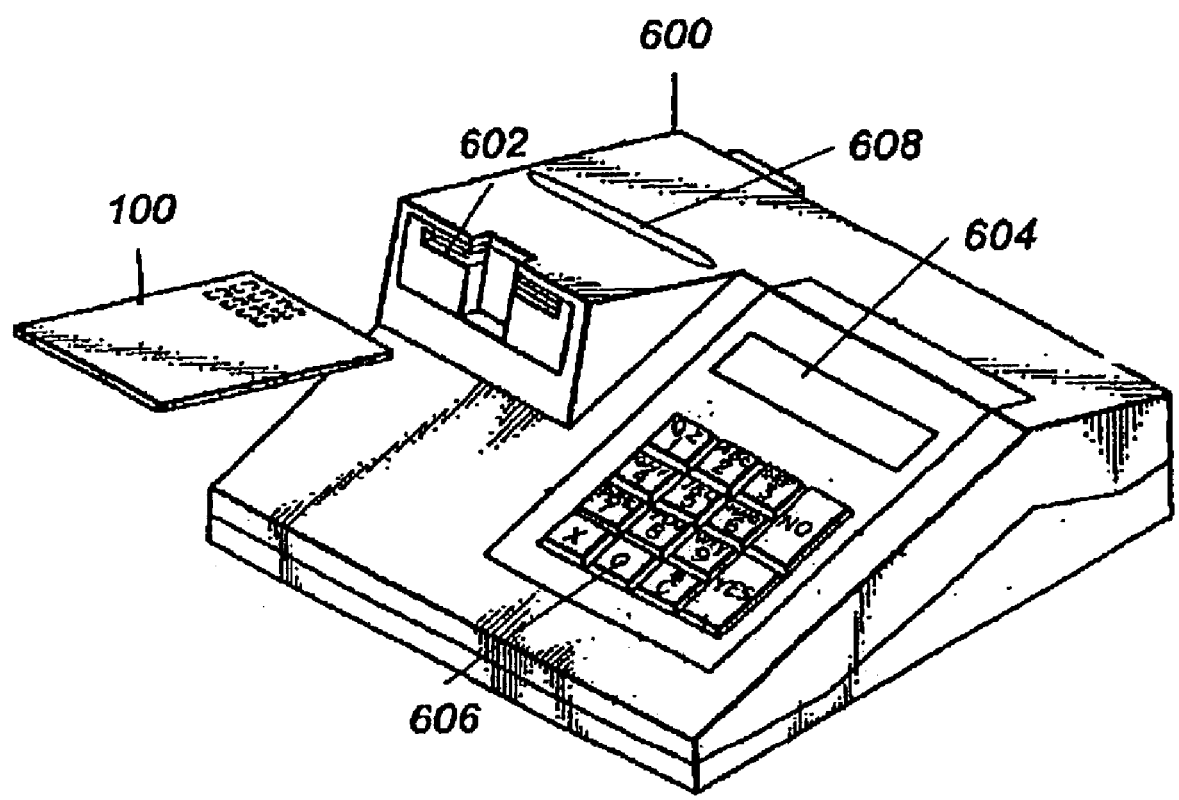
FIG. 6 illustrates a point of sale transaction terminal according to an exemplary embodiment of the present invention.

FIG. 6 illustrates a point-of-sale transaction/recording terminal for use with the card 100. A typical terminal 600 includes a card reader 602, a keypad 606, a display 604, and a receipt dispenser 608. Keypad 606 and display 604 allow a cardholder or a merchant to interact with the terminal. Keypad 606 allows the cardholder or the merchant to select a type of transaction, e.g., credit, debit, electronic cash, or non-payment applications, to input a PIN, and to input transactional information. Display 604 allows the cardholder and the merchant to receive informational messages, such as card approvals and authorization codes, and prompts for data entry.

Figure 7:
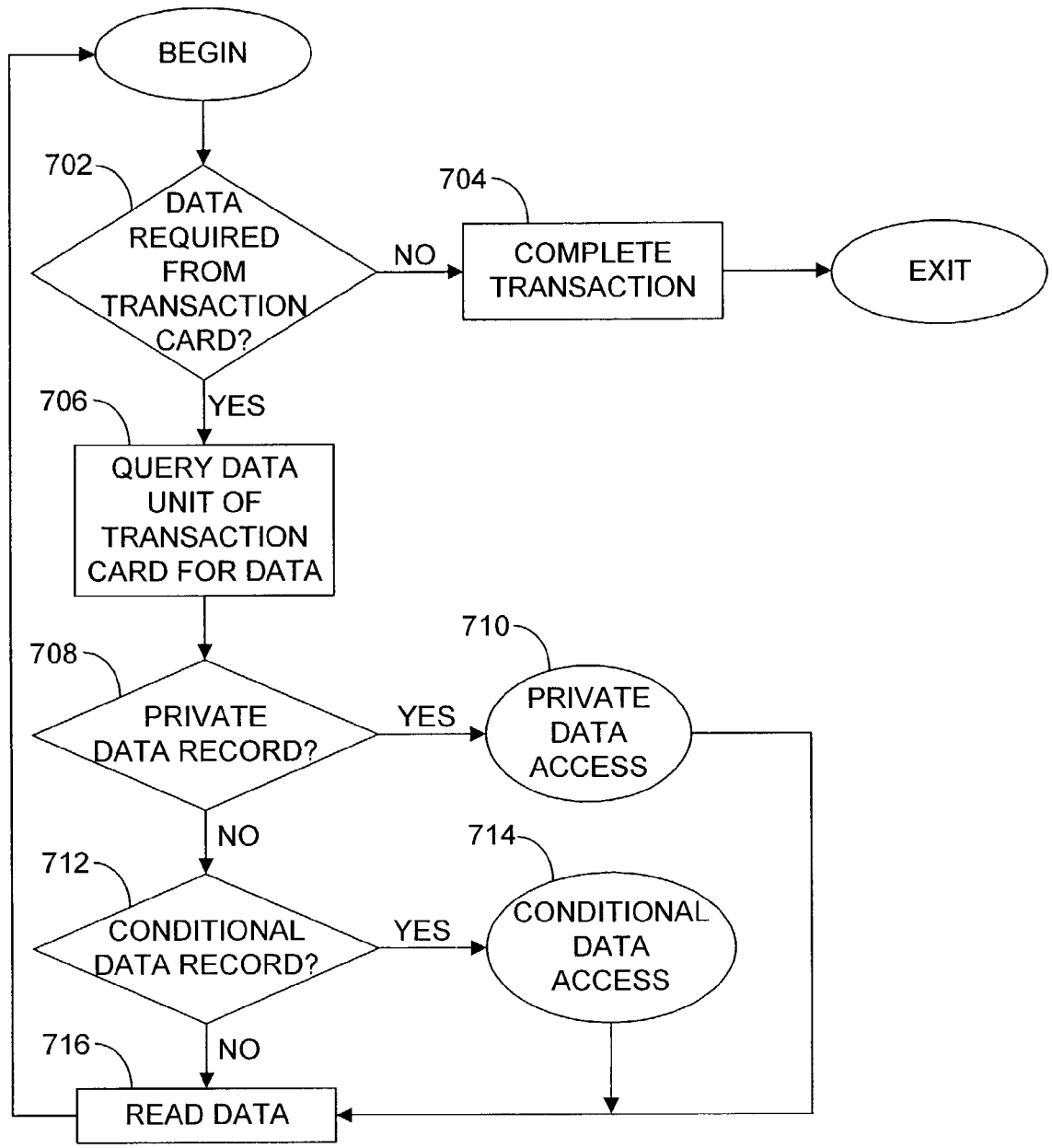
FIG. 7 illustrates a process whereby a point of sale terminal accesses data located within the transaction card necessary to conclude a transaction according to an exemplary embodiment of the present invention.

FIG. 7 illustrates a process 700 whereby a POS terminal accesses data located within the transaction card 100 necessary to conclude a transaction. The process 700 begins at step 702. At step 702 the POS terminal determines if any additional data from the transaction card 100 is necessary to complete the transaction. If the POS terminal needs additional data from the transaction card 100, the process 700 advances to step 706. If the POS terminal does not need any additional data from the transaction card 100, the process 700 advances to step 704.

At step 704, the POS terminal concludes the transaction in a typical manner understood by those of ordinary skill in the art. The POS terminal may need to communicate information concerning a purchase to a payment system, for example MasterCard®, receive information or authorization from the payment system, or the like. Once the POS terminal concludes the transaction the process 700 exits.

At step 706, the POS terminal queries the data unit 250 of the integrated circuit 122 of the transaction card 100 for specific information. The POS terminal queries the data unit 250 by specifying a particular label associated with the desired data.

At step 708, the POS terminal determines if the security level field 266 of the data record associated with the requested label is set to private. If the security level field 266 of the data record associated with the requested label is set to private, the process 700 advances to step 710. The step 710 is described in more detail in relation to FIG. 8. If the security level field 266 of the data record associated with the requested label is not set to private, the process 700 advances to step 712.

At step 712, the POS terminal determines if the security level field 266 of the data record associated with the requested label is set to conditional. If the security level field 266 of the data record associated with the requested label is set to conditional, the process 700 advances to step 714. The step 714 is described in more detail in relation to FIG. 9. If the security level field 266 of the data record associated with the requested label is not set to conditional, the process 700 advances to step 716.

At step 716, the POS terminal reads the data stored in the data field 264 of the data record associated with the requested label. Once the POS terminal has read the data, the process 700 advances to step 702.

Figure 8:
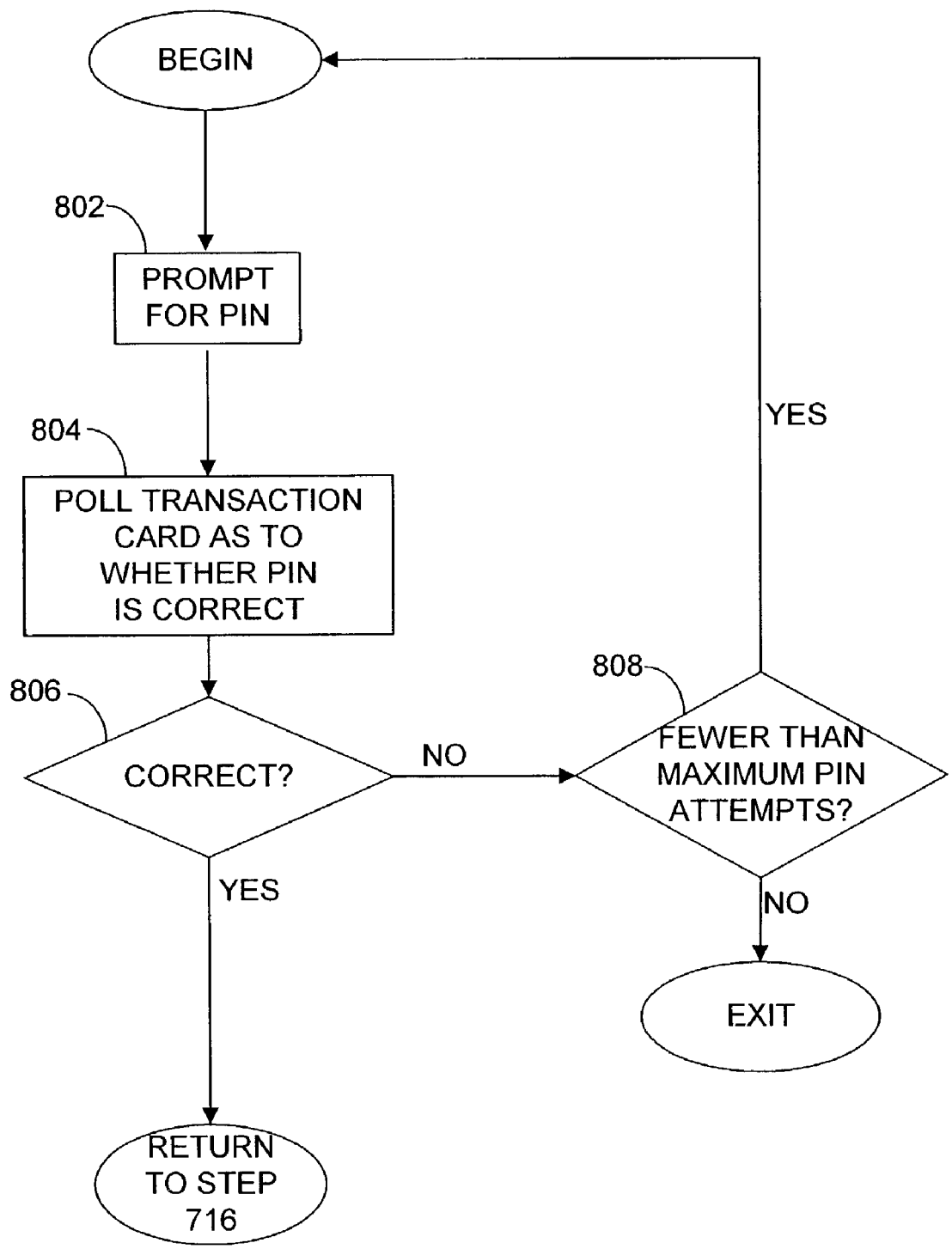
FIG. 8 illustrates a process whereby the point of sale terminal provides a personal identification number to the transaction card in order to have the transaction card decrypt a desired data field according to an exemplary embodiment of the present invention.

FIG. 8 illustrates a process 710 whereby the point of sale terminal provides a PIN to the transaction card 100 in order to have the transaction card 100 decrypt the requested data. If the security level field 266 is set to private, the POS terminal needs to specify a PIN, received from a customer, to the IC 122 of the transaction card 100 in order to have the IC 122 decrypt the desired data stored in the data field 264 of the specified data record. The process 710 begins at step 802. At step 802 the POS terminal prompts the customer for a PIN. Once the customer specifies the PIN, the process 710 advances to step 804.

At step 804, the POS terminal polls the transaction card 100 to determine if the specified PIN is correct. Once the POS terminal has sent the PIN to the IC 122 of the transaction card 100, the process 710 advances to step 806.

At step 806, the POS terminal receives an indication from the IC 122 of the transaction card 100 telling the POS terminal whether the PIN was correct. If the PIN was correct, the process 710 advances to step 716 of the process 700. If the PIN was not correct, the process 710 advances to step 808.

At step 808, the POS terminal receives an indication from the IC 122 of the transaction card 100 telling the POS terminal whether the IC 122 of the transaction card 100 terminated the session. If the maximum number of PIN attempts, specified by the data field 264 of the data record 284, is exceeded, the process 710 exits and the process 700 exits. If the maximum number of PIN attempts is not exceeded, the process 710 advances to the step 802.

Figure 9:
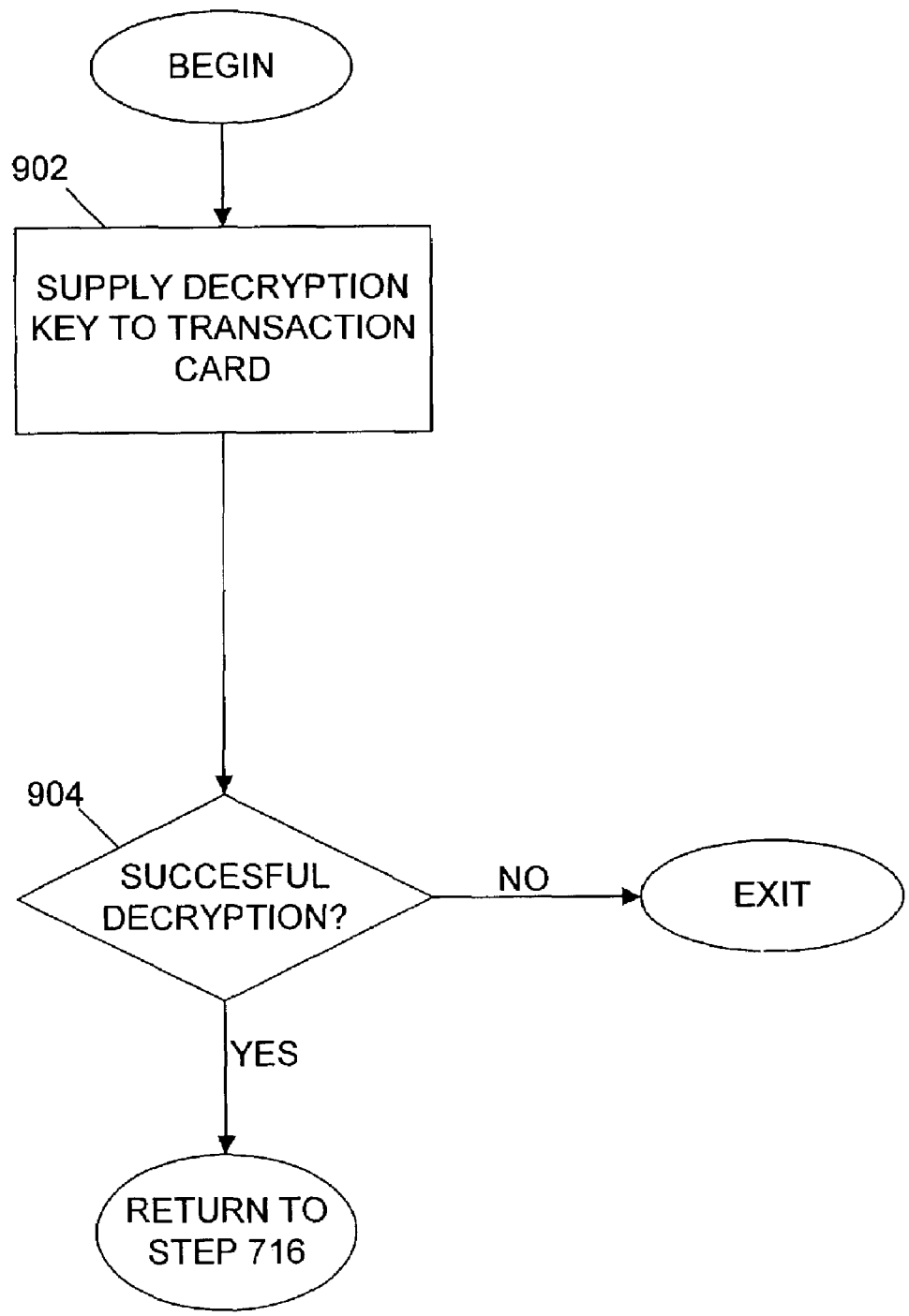
FIG. 9 illustrates a process whereby the point of sale terminal provides a particular decryption key to the transaction card in order to have the transaction card decrypt the requested data according to an exemplary embodiment of the present invention.

FIG. 9 illustrates a process 714 whereby the POS terminal provides a particular decryption key to the transaction card 100 in order to have the transaction card 100 decrypt the requested data. If the security level field 266 is set to conditional, the POS terminal needs to specify the particular decryption key to the IC 122 of the transaction card 100 in order to have the IC 122 decrypt the desired data stored in the data field 264 of the specified data record. The process 714 begins at step 902. At step 902 the POS terminal supplies the particular decryption key to the IC 122 of the transaction card 100. Once the POS terminal specifies the particular decryption key, the process 714 advances to step 904.

At step 904, the POS terminal receives an indication from the IC 122 of the transaction card 100 telling the POS terminal whether the decryption was successful. If the decryption was successful, advances to the step 716 of the process 700. If the decryption was not successful, the process 714 exits.

Although the present invention has been described with reference to certain preferred embodiments, various modifications, alterations, and substitutions will be known or obvious to those skilled in the art without departing from the spirit and scope of the invention, as defined by the appended claims.

We claim:

1. A system for obtaining and storing information in an integrated circuit card used by a cardholder for conducting transactions over one or more environments each having a different type of card-accepting terminal, comprising:
   a memory unit in said card having data records for storing information, said records being accessible by a terminal computer operating compatible software and said records having both formatted and unformatted fields, said formatted fields being accessible using generic labels, and said unformatted fields being accessible using non-generic labels;
   wherein generic labels are labels understandable to a variety of terminal types;
   non-generic labels are labels understandable only to specific terminal types;
   wherein the formatted fields are fields that are understandable to a variety of terminal types and software associated with said terminal types;
   and the unformatted fields are fields that are understandable only to specific terminal types and software associated with said terminal types.

2. The system of claim 1, wherein said formatted fields are accessible using generic labels over at least two different environments.

3. The system of claim 1, wherein each of said formatted fields contain information having generic meaning and each of said unformatted fields contain information having meaning only to a particular terminal software type.

4. The system of claim 3, wherein each of said data records includes an associated security level field for storing data indicative of a level of security to be applied to the associated data record.

5. The system of claim 4, wherein said level of security includes one or more of public, private or conditional.

6. The system of claim 4, wherein said generic labels are stored in a formatted name field of said data record.

7. The system of claim 6, wherein said types of card-accepting terminals include a POS terminal, a PDA device, a mobile device and a personal computer.

8. The system of claim 7, wherein said formatted fields are populated by said cardholder, a merchant or an issuer.

9. The system of claim 8, wherein said cardholder is provided through said card-accepting terminal with targeted information based on data stored in said data records.

10. The system of claim 9, wherein said targeted information is based on data stored in said unformatted fields.

11. A memory device located within an integrated circuit of an integrated circuit card, comprising:
 a plurality of formatted data records, said data records being accessible by a terminal computer operating compatible software, wherein each of the plurality of formatted data records include a generic name portion and a data portion, wherein labels stored in the generic name portion of each of the plurality of formatted data records are known to a plurality of terminal types and software associated with said terminal types;
 and a plurality of unformatted data records, said data records being accessible by a terminal computer operating compatible software, wherein each of the plurality of unformatted data records include a non-generic name portion and a data portion
 and wherein the unformatted data records are understandable only to specific terminal type and software associated with said terminal types.

12. The memory device of claim 11, wherein the name portion of one of the plurality of formatted data records is used by one of the plurality of terminals to access the corresponding data portion of the one of the plurality of formatted data records.

13. The memory device of claim 11, wherein each of the plurality of formatted data records further includes a security level portion.

14. The memory device of claim 13, wherein the security level portion of each of the plurality of formatted data records is one of public, conditional and private.

15. The memory device of claim 14, wherein the data portion of one of the plurality of formatted data records may be read by one of the plurality of terminals if the security level portion of the one of the plurality of formatted data records is public.

16. The memory device of claim 14, wherein the data portion of one of the plurality of formatted data records may be read by one of the plurality of terminals having a particular decryption key if the security level portion of the one of the plurality of formatted data records is conditional based on the particular decryption key.

17. The memory device of claim 16, wherein the particular decryption key is an industry specific decryption key.

18. The memory device of claim 17, wherein the industry specific decryption key is specific to a card issuing authority.

19. The memory device of claim 18, wherein the card issuing authority is MasterCard.

20. The memory device of claim 18, wherein the data portion of one of the plurality of formatted data records may be read by one of the plurality of terminals if the security level portion of the one of the plurality of formatted data records is private only if a personal identification number is provided to the one of the plurality of terminals.

21. The memory device of claim 11, wherein a label stored in the non-generic name portion of one of the plurality of unformatted data records is known to one of the plurality of terminals that wrote the label.

22. The memory device of claim 21, wherein the one of the plurality of terminals transmits a message to another of the plurality of terminals, wherein the message contains a reference to the label stored in the non-generic name portion of the one of the plurality of unformatted data records.

23. The memory device of claim 11, wherein the terminal is one of a point of sale terminal, a personal computer, a personal digital assistant and a mobile device.

24. The memory device of claim 23, wherein the terminal can access data stored in the plurality of formatted data records if the terminal is a mobile device.

25. The memory device of claim 24, wherein the terminal can write data to the plurality of formatted data records if the terminal is a mobile device.

26. The memory device of claim 23, wherein the terminal can access data stored in the plurality of formatted data records and write data to the plurality of formatted data records if the terminal is a personal digital assistant.

27. The memory device of claim 23, wherein the terminal can access data stored in the plurality of formatted data records and write data to the plurality of formatted data records if the terminal is a personal computer.

28. The memory device of claim 23, wherein the terminal can access data stored in the plurality of formatted data records and write data to the plurality of formatted data records if the terminal is a point of sale terminal.

29. A method for utilizing information in a memory device located within an integrated circuit of an integrated circuit card, comprising the steps of:
 storing one of a plurality of formatted data records, said records being accessible by a terminal computer operating compatible software, wherein each of the plurality of formatted data records include a generic name portion and a data portion, wherein labels stored in the generic name portion of each of the plurality of formatted data records are known to a plurality of terminal types and software associated with said terminal types;
 and storing one of a plurality of unformatted data records, said records being accessible by a terminal computer operating compatible software, wherein each of the plurality of unformatted data records include a non-generic name portion and a data portion
 and wherein the unformatted data records are understandable only to specific terminal types and software associated with said terminal types.

30. The method of claim 29, further comprising the step of: accessing one of the plurality of formatted data records to complete a transaction with the integrated circuit card.

31. The method of claim 29, wherein the name portion of one of the plurality of formatted data records is used by one of the plurality of terminals to access the corresponding data portion of the one of the plurality of formatted data records.

32. The method of claim 29, wherein each of the plurality of formatted data records further includes a security level portion.

33. The method of claim 32, wherein the security level portion of each of the plurality of formatted data records is one of public, conditional and private.

34. The method of claim 33, wherein the data portion of one of the plurality of formatted data records may be read by one of the plurality of terminals if the security level portion of the one of the plurality of formatted data records is public.

35. The method of claim 33, wherein the data portion of one of the plurality of formatted data records may be read by one of the plurality of terminals having a particular decryption key if the security level portion of the one of the plurality of formatted data records is conditional based on the particular decryption key.

36. The method of claim 35, wherein the particular decryption key is an industry specific decryption key.

37. The method of claim 35, wherein the industry specific decryption key is specific to a card issuing authority.

38. The method of claim 37, wherein the card issuing authority is MasterCard.

39. The method of claim 33, wherein the data portion of one of the plurality of formatted data records may be read by one of the plurality of terminals if the security level portion of the one of the plurality of formatted data records is private only if a personal identification number is provided to the one of the plurality of terminals.

40. The method of claim 29, wherein a label stored in the non-generic name portion of one of the plurality of unformatted data records is known to one of the plurality of terminals that wrote the label.

41. The method of claim 40, wherein the one of the plurality of terminals transmits a message to another of the plurality of terminals, wherein the message contains a reference to the label stored in the non-generic name portion of the one of the plurality of unformatted data records.

42. The method of claim 29, wherein the terminal is one of a point of sale terminal, a personal computer, a personal digital assistant and a mobile device.

43. The method of claim 42, wherein the terminal can access data stored in the plurality of formatted data records if the terminal is a mobile device.

44. The method of claim 43, wherein the terminal can write data to the plurality of formatted data records if the terminal is a mobile device.

45. The method of claim 42, wherein the terminal can access data stored in the plurality of formatted data records and write data to the plurality of formatted data records if the terminal is a personal digital assistant.

46. The method of claim 42, wherein the terminal can access data stored in the plurality of formatted data records and write data to the plurality of formatted data records if the terminal is a personal computer.

47. The method of claim 42, wherein the terminal can access data stored in the plurality of formatted data records and write data to the plurality of formatted data records if the terminal is a point of sale terminal, labels and the unformatted fields are accessible using a non-generic label.

* * * * *